United States Patent [19]

Cummins et al.

[11] Patent Number: 4,776,231
[45] Date of Patent: Oct. 11, 1988

[54] ADJUSTABLE AUTOMOBILE MIRROR SYSTEM

[75] Inventors: Michael Cummins, Mount Clemens; James M. Cummins, Warren; Raymond A. Theys, Clawson, all of Mich.

[73] Assignee: NI Industries, Inc., Novi, Mich.

[21] Appl. No.: 125,737

[22] Filed: Nov. 30, 1987

Related U.S. Application Data

[63] Continuation of Ser. No. 877,887, Jun. 24, 1986, abandoned, which is a continuation of Ser. No. 493,934, May 12, 1983, Pat. No. 4,640,142.

[51] Int. Cl.$^4$ .............................. F16C 1/10; B60R 1/06
[52] U.S. Cl. ..................................... 74/502.1; 350/632; 248/476
[58] Field of Search ............ 74/501 M; 248/476, 479; 350/632; 403/135, 143, 71, 321, 326, 289, 405.1; 24/664, 665, 662

[56] References Cited

U.S. PATENT DOCUMENTS

| | | | |
|---|---|---|---|
| 3,339,877 | 9/1967 | Valenzuela | 248/481 |
| 3,417,365 | 12/1968 | Krehbiel | 403/326 X |
| 3,618,420 | 11/1971 | Horwitt et al. | 74/471 R |
| 3,686,896 | 8/1972 | Rutter | 403/321 X |
| 3,917,212 | 11/1975 | Hadley | 74/501 M |
| 3,933,058 | 1/1976 | Kraine | 74/501 M |
| 3,972,597 | 8/1976 | Repay et al. | 74/502.1 X |
| 4,027,548 | 6/1977 | Cummins | 74/501 M |
| 4,116,538 | 9/1978 | Oskam | 74/471 XY X |
| 4,197,762 | 4/1980 | Yamana | 74/502.1 |
| 4,458,392 | 7/1984 | Pogharian et al. | 24/664 |
| 4,628,760 | 12/1986 | Huddleston | 74/501 M |

FOREIGN PATENT DOCUMENTS

| | | | |
|---|---|---|---|
| 1390939 | 1/1965 | France | 248/476 |
| 2454938 | 12/1980 | France | 74/501 M |
| 2504075 | 10/1982 | France | 350/632 |

Primary Examiner—Gary L. Smith
Assistant Examiner—Rodney M. Lindsey
Attorney, Agent, or Firm—Harness, Dickey & Pierce

[57] ABSTRACT

In an adjustable automobile mirror system of either the manual type or a three-cable operated type including a mirror anchored to a mirror retainer whose position is adjustable relative to a mirror housing, the improved mounting of the mirror retainer upon the mirror housing which comprises a part-spherical head upon the housing and a pivot block having a socket movably mounted upon the head. Resilient detents on the mirror retainer receive and retainingly engage the pivot block for movements therewith. One detent is manually yieldable to facilitate selective assembly of the mirror retainer on and disassembly from the pivot block.

8 Claims, 6 Drawing Sheets

ADJUSTABLE AUTOMOBILE MIRROR SYSTEM

This is a continuation of U.S. patent application Ser. No. 877,887, filed June 24, 1986, now abandoned, which is a continuation of U.S. patent application Ser. No. 493,934, filed May 12, 1983 now U.S. Pat. No. 4,640,142.

BACKGROUND OF THE INVENTION

The manually adjustable mirror assembly or system and the three-cable adjustable control mirror system disclosed herein are widely used on automobiles for controlling mirrors mounted thereon. In units of this type it has been necessary to replace the entire mirror system when the mirror has been broken; the housing dented or damaged; or the cables or other components of the assembly or system broken. Heretofore it has been necessary to remove the entire mirror assembly from the vehicle body and replace it with another mirror at considerable expense regardless of whether the mirror assembly damaged is a manually adjustable mirror assembly or is a remote control cable operated mirror system.

Thus should any interior part or component of the mirror assembly or system be damaged, there was no convenient access to the interior of the mirror housing unless the entire mirror assembly was disassembled from its mounting upon a vehicle door or body. Even a broken glass mirror required an entirely new assembly and this specific problem occurs frequently in 95% of the damage done to the mirror system. With the covential attachment of a plurality of cables from a remote control extending into the mirror housing and connected to the mirror support, it has been practically impossible to replace the cables without removing the complete remote control mirror assembly from the vehicle.

THE PRIOR ART

Examples of remote control mirrors of the present type, owned by the assignee of record, are shown in the following prior U.S. Pat.:

No. 3,195,369, John G. Warhol, issued July 20, 1965; No. 3,253,481, John G. Warhol, issued May 31, 1966; No. 3,618,420, Lawrence G. Horwitt et al, issued Nov. 9, 1971; No. 3,719,105, Lawrence G. Horwitt et al, issued Mar. 6, 1973; and, No. 4,027,548, James M. Cummins, issued June 7, 1977. This last mentioned patent illustrates a three-cable control system which utilizes a slotted ball stud element or pivot boss as does the present invention.

SUMMARY OF THE INVENTION

It is the primary feature of the present invention to provide a mirror system or assembly, either manually or remotely adjustable, wherein the mirror retainer within the mirror housing may be manually disengaged from the universally adjustable pivot block within the mirror housing, either by hand or by a hand held tool.

Another feature is to provide resilient detent means upon the mirror retainer for receiving and retainingly engaging the pivot block for generally universal movements therewith and wherein the detent means are manually yieldable to facilitate selective assembly of the mirror retainer on and disassembly from the pivot block.

A further feature is to provide a field serviceable mirror mounting for a mirror system or assembly whereby the mirror retainer and the mirror thereon may be easily and quickly disengaged from the mirror assembly for removal and replacement.

A still further feature provides a manually controlled detent means by which the mirror retainer is snapped "on" or snapped "off" from its assembly with the universally adjustable pivot block within the mirror housing.

Another feature is to provide a means by which the mirror and its support may be quickly and easily removed from the mirror housing for access to the interior thereof for repair or replacement of parts including the control cables, if any.

A further feature includes the use of at least a part-spherical head support mounted directly upon the mirror housing or upon a removable bracket within the mirror housing and upon which the mirror retainer and the mirror are removably mounted. Such a structure accommodates most drivers of automobiles. In certain situations shims may be employed in the mounting of the bracket upon the mirror housing so that the angles of the mirror is adjusted to accommodate tall people or very short people. The shims slightly change the angle of the bracket including the longitudinal pivot axis of the part-spherical head upon which the mirror retainer is universally mounted.

A further feature incorporates the use of an improved pivot block upon which the mirror retainer is removably mounted manually and wherein an improved mechanism is provided for removably connecting the pivot block upon the head of the pivot bracket and with respect to the cnotrol cables which extend therethrough.

These and other features and objects will be seen from the following specification and claims in conjunction with the appended drawings.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

The three cable control system disclosed herein is widely used on automobiles for remotely controlling mirrors mounted thereon.

The remote controlled mirror system or assembly of the present invention generally comprises of a mirror base 10 which may, for example, be secured to the door panel of an automobile, not shown, and a protective mirror housing 14 integral with the base 10. A plurality of threaded fasteners 12 project outwardly of the base 10 and are adapted for securing within corresponding spaced apertures formed in a portion of the vehicle body or door. The present protective mirror housing 14 and base 10 may be fabricated of cast metal or from a plastic material. The housing 14, on the interior thereof, has a plurality of parallel spaced bracket bosses 28.

The mirror housing 14 includes a chamber or inner space 16 and an open front 18 of a pre-determined shape, which in the illustrative embodiment is substantially rectangular with rounded corners. The mirror retainer 20, preferably constructed of a plastic material, includes peripheral flange 22 to cooperatively receive a mirror 26 which bears against the corresponding backing surfaces 24 and is suitably secured thereto in a conventional manner such as with an adhesive material.

Within the mirror housing 14 and chamber 16 there is provided a plurality of parallel spaced bracket bosses 28 which form a part of and are integral with the mirror housing 14. The corresponding outer ends of the respective bosses are coplanar and have apertures 30 therein.

Figure 1:
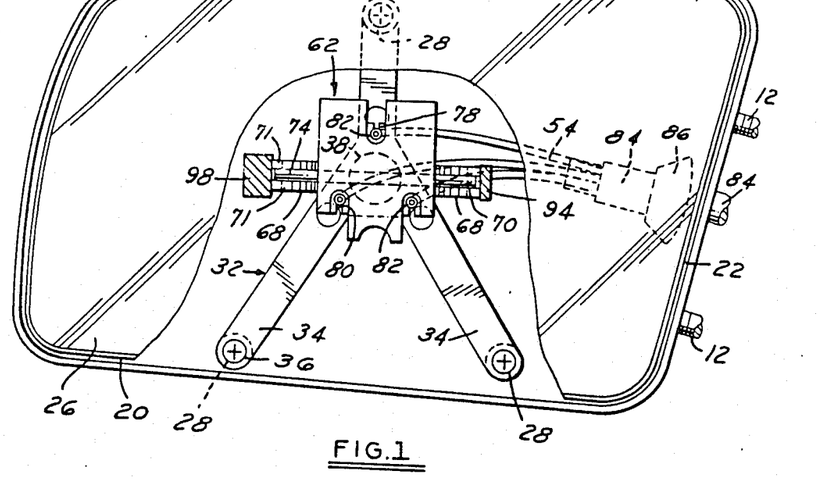
FIG. 1 is a front elevational view of the present remote control mirror assembly with certain portions partly broken away and in cross section.
Figure 2:
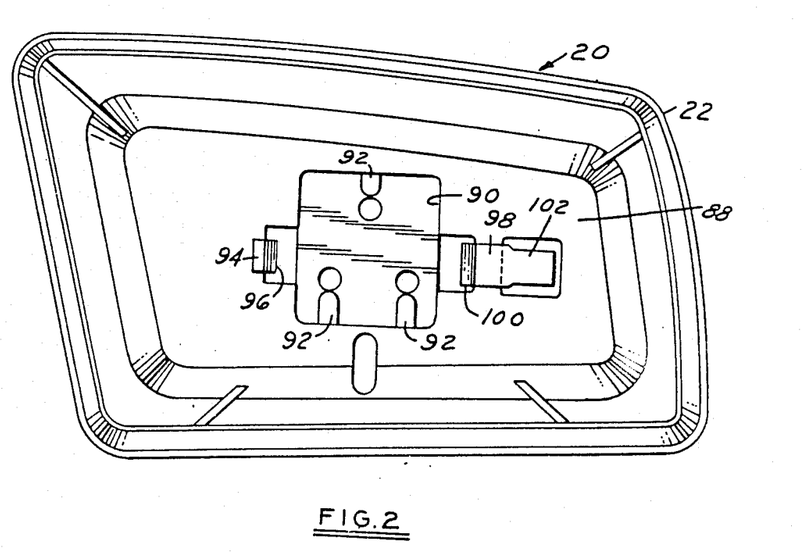
FIG. 2 is a rear elevational view of the mirror retainer shown in FIG. 1 illustrating the integral socket and yieldable detent means provided thereon for receiving and retaining the universally adjustable pivot block shown in FIG. 1.

Pivot bracket 32, FIG. 1, generally of inverted Y-shape and of a cast material, such as Zinc, includes the angularly related arms 34 apertured at their outer ends to receive the fasteners 36. The fasteners 36 secure the pivot bracket 32 to the bosses 28 upon the interior of the mirror housing 14. Centrally projecting from the bracket 32 is the stud element or pivot boss 38 which extends upon a longitudinal pivot axis 42, FIG. 3, and terminates in the hemispherical head 40.

Figures 3, 4:
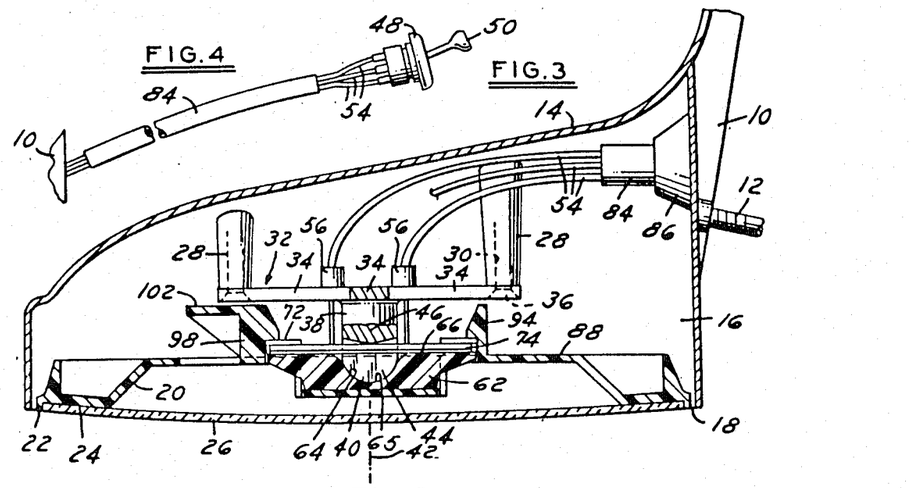
FIG. 3 is a horizontal section of the remote control mirror assembly with the base partly borken away and in section.
FIG. 4 is a fragmentary perspective view of the remote control for the mirror assembly of FIG. 1.
Figure 5:
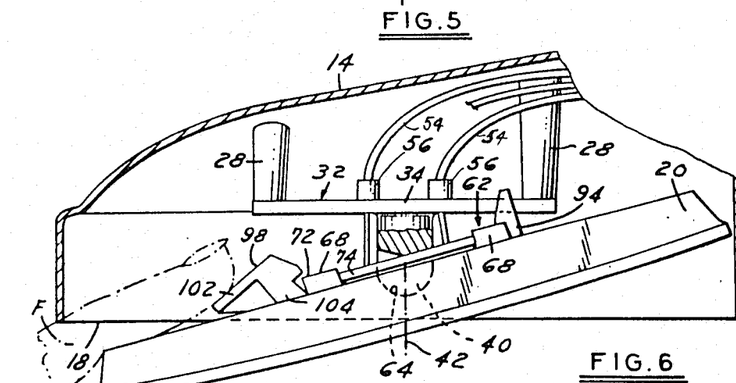
FIG. 5 is a partly sectioned fragmentary plan view of the mirror assembly with portions of the housing broken away and illustrating the manual release of the mirror retainer from the pivot block.
Figure 6:
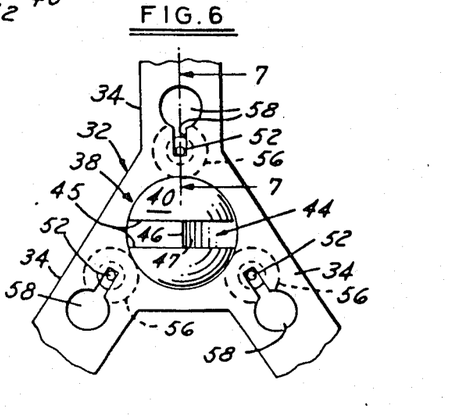
FIG. 6 is a fragmentary front elevational view of the pivot bracket and head of FIG. 1 with portions broken away.

Transverse pin receiving slot 44, FIG. 6, extends through the hemispherical head 40 and opens outwardly at the end thereof, FIG. 3. Slot 44 is defined by a pair of opposed flat side walls 45 and a bottom wall which includes a pair of inclined bottom surface portions 47 intersecting centrally between the pair of side walls 45 to define the fulcrum 46, FIG. 3. The point of intersection of the bottom surface portions 47 defines the point of contact 46 with respect to the stabilizing pin 66, FIGS. 1, 3, 5 and 9.

The cable control system for the mirror 26 is conventional, consisting of a remote control knob 50, FIG. 4, which is universally pivotally mounted in a control unit 48 adapted to be located on the interior door panel of an automobile, for illustration. Such a unit may be constructed in accordance with the disclosures of U.S. Pat. Nos. 3,195,369 or 3,253,481, for example. In a conventional manner universal movement of the control knob 50 actually actuates 3 Bowden cables 52 longitudinally slidable within protective sleeves 54. The ends of the cables 52 remote from control knob 50 are inserted through the base 10 into the mirror housing 14 and pass through small access holes in bosses 56 in pivot bracket 32. At their ends, cables 52 are removably connected to the universally adjustable pivot block 62 within slots 76 therein, FIGS. 1 and 9, by means of retaining sleeves or ferrules 82. There are crimped in place upon the ends of cables 52.

Figures 7, 8:
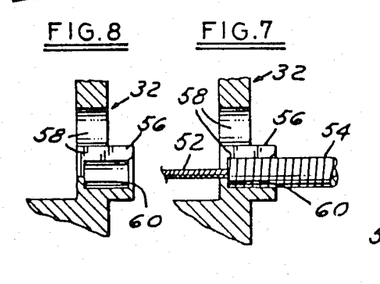
FIG. 7 is fragmentary section taken in the direction of arrows 7—7 of FIG. 6 illustrating the connection of the cable sleeve and cable upon portions of the pivot bracket.
FIG. 8 is a fragmentary section similar to FIG. 7, with the cable and sleeve removed.
Figure 9:
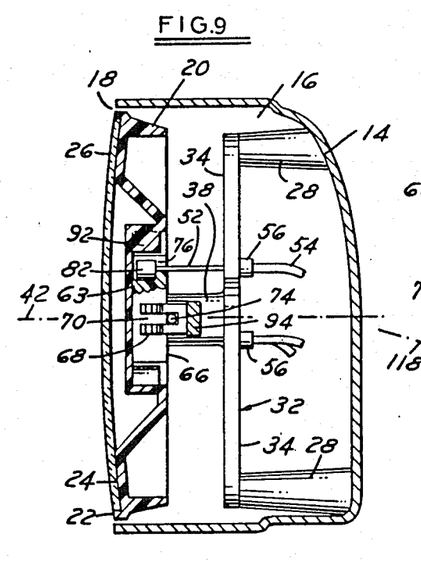
FIG. 9 is a central vertical section of the remote control mirror assembly taken through the pivot axis shown in FIG. 3.

Projecting from the rear of the pivot bracket 32, FIGS. 3, 5 and 9 are a plurality of apertured bosses 56 in registry with corresponding keyhole slots 58 which extend through the pivot bracket 32 defining within the bracket 32 stop shoulders 60 adapted to retainingly receive the ends of the protective sleeves 54, FIG. 7. Adjustable cables 52 extend through sleeves 54 and outwardly of bracket 32. As shown in FIGS. 7 and 8, the keyhole slots 58 are in registry with a corresponding straight slot within the sleeves 56.

Each of the flexible cables 52 project forwardly of bracket 32 and at their ends have secured thereon the ferrules 82 which provide a means by which the respective cables 52 are removably interlocked with pivot block 62. The pivot block 62 is preferably constructed of the plastic material Nylon. The pivot block 62 is shown in perspective in FIG. 10 on an enlarged scale and is shown assembled with respect to the hemispherical head 40 in FIG. 3.

Upon one side of the pivot block 62 centrally thereof there is provided seat 64, which may be hemispherical as at 65 in cooperative registry with and receiving the hemispherical head pivot 40.

Figure 10:
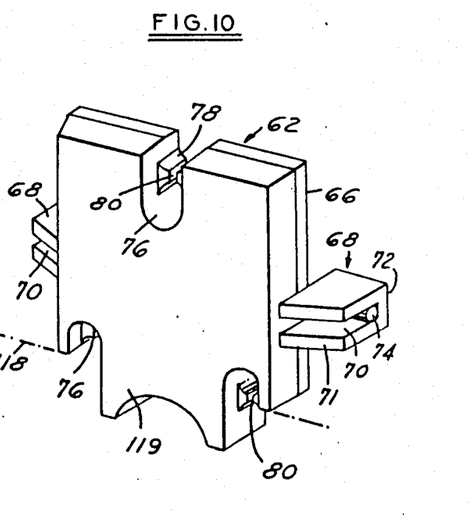
FIG. 10 is a perspective view of the pivot block shown in FIG. 1, on an increased scale.
Figure 12:
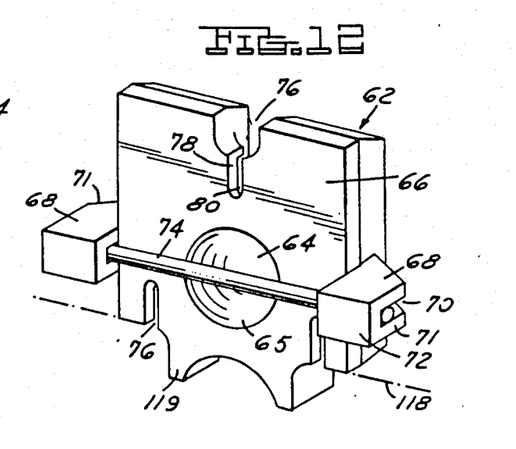
FIG. 12 is a perspective view of the pivot block shown in FIGS. 1 and 10, taken from another angle to illustrate the recess or seat and the stabilizing pin.

The pivot block 62 includes a flat back surface 66. A pair of opposed aligned mount bosses 68 form a part of the pivot block 62 and project laterally thereof and extend rearwardly of the back surface 66. Each of the mount bosses 68 has a forwardly opening slot 70 defined by a pair of parallel spaced side walls 71 and have rearwardly extending anchor surfaces 72. The bosses 68 are adapted to supportably and snugly receive the ends of the stabilizer pin 74 which extends across the back surface 66 of the pivot block 62 as illustrated in FIGS. 10 and 12. The pin 74 is normally centrally positioned within the transverse slot 44 of the hemispherical head 40, FIG. 9.

The slot 44 opens at the outer end of the head 40 so that the stabilizer pin 74 intermediate its ends is received therein and adapted to be positioned adjacent the fulcrum 46 defined in the bottom surfaces of the transverse slot 44. Formed within the top of the pivot block 62, FIGS. 10 and 12 is the upwardly opening cable anchor slot 76. Additional pairs of laterally spaced downwardly opening cable anchor slots 76 are formed adjacent the lower edge of the pivot block 62. Within each of the slots 76 there is formed a keyhole boss 78 forming a slot 80 of reduced width as shown in FIGS. 10 and 12. As above described, each of the corresponding control cables 52 have secured upon their ends the retaining sleeves or ferrules 82.

The cables 52 are connected to the pivot block 62 snugly and under compression. The cables 52 are of such length as to be individually translated inwardly through the corresponding keyhole 78 of each of the slots 76. At the same time the cable anchoring ferrules 82, FIGS. 1 and 9, retainingly engage outer portions of the corresponding keyhole bosses 78 within the outwardly opening slots 76. This provides a means by which the pivot block 62 is removably secured to the outer ends of the corresponding cables 52. This retains the pivot block 62 so that its seat 64 is in cooperative registry with and receives the hemispherical pivot head 40 in compression.

In a conventional well known manner, the remote control unit 48 is arranged so that universal adjustments of the remote control knob 50 provides such corresponding longitudinal movements of the cables 52 within their protective sleeves 54 and the sheath 84 so as to effect corresponding universal adjustments of the pivot block 62 with respect to the hemispherical pivot head 40.

As an alternative to the flat bottom seat 64 shown in FIG. 5, the seat may be hemispherical to cooperatively receive the hemispherical head 40. The flexible sheath 84 protectively surrounds the cables 52 within their corresponding sleeves 54, FIG. 4 and extends from the manually remote control 50-48 through the vehicle door, through a corresponding aperture in the base 10 on housing 14 and into the chamber 16 as shown in FIG. 3, A suitable sealing grommet 86 surrounds the sheath 84 and is anchored through the housing wall.

SNAP ON-SNAP OFF ASSEMBLY FOR MIRROR RETAINER

Figure 11:
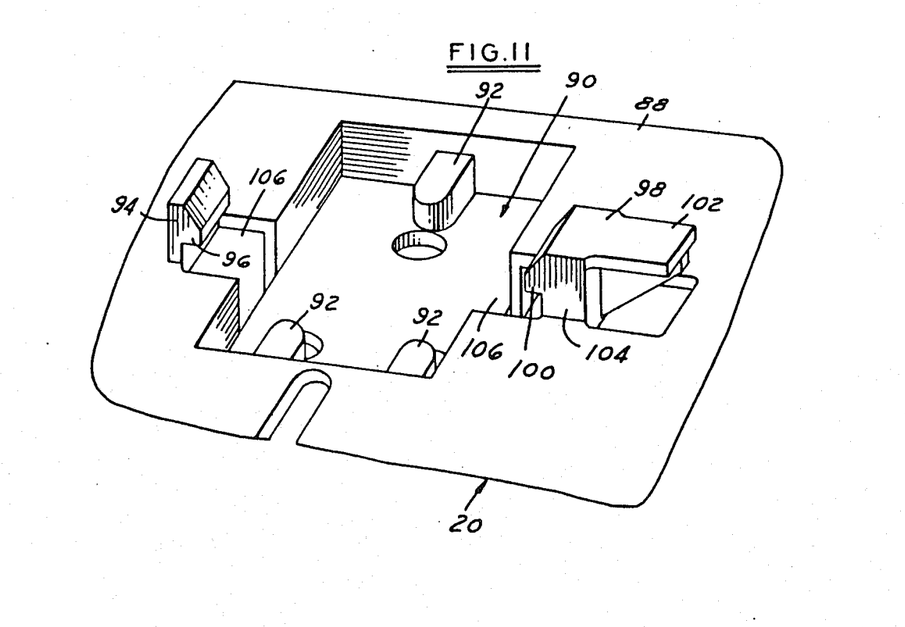
FIG. 11 is a fragmentary perspective view of the mirror retainer and its pivot block recess for receiving the pivot block as shown in FIGS. 3, 5 and 9.

Formed within the rear surface 88 of the mirror retainer 20, such as shown in FIGS. 3 and 11, there is provided a rectangular pivot block recess 90 or recessed portion of such shape and size as to snugly receive the pivot block 62.

Formed upon the interior of the recessed portion 90 there is provided a plurality of ferrule retaining bosses 92, so arranged with respect to the top and bottom of the recessed portion 90, that upon assembly of the mirror retainer recess 90 over the pivot block 62, such as shown in FIGS. 3 and 9, the ferrule retaining bosses 92 are radially outward of the corresponding pivot slots 76. This prevents any radial outward disengaging movement of the ferrules 82 with respect to the slots 76. Bosses 92 entrap or capture the cable ferrules 82 within the slots 76.

Thus, the pivot block 62 is snugly connected with the ferrules 82 upon the ends of the corresponding control cables 52 and positioned snugly against the hemispherical head 40. On positioning of the pivot block 62 within the recess portion 90 in the mirror retainer 20, the corresponding bosses 92 prevent any disengagement of the cables 52 with respect to the pivot block 62.

Mounted upon the rear surface 88 of of the mirror retainer 20 forming an integral part thereof, there is provided a pair of spaced resilient detent means or catches 94 and 98. Each of the catches 94 and 98 have inwardly projecting detents 96 and 100 respectively which are adapted to overlie and retainingly engage rear surface portions 72 of the pivot block bosses 68. This is shown in FIG. 3. Outwardly of the recessed portion 90 are a pair of aligned clearance slots 106, FIG. 11, adapted to cooperatively receive the corresponding mount bosses 68 of the pivot block 62. The finger piece 102 on the flexible catch 98 may be manually depressed utilizing human finger F. The flexible catch 98 and detent means 100 is pivoted with respect to its flexible leg 104, FIGS. 5 and 11. It is shown in a disengagement or release position in FIG. 5.

In normal operation, should it be desired to manually remove the mirror retainer 20 from the interior of the mirror housing 14 all that is necessary is to activate the remote control unit 50 so that the retainer 20 is tilted to the angular position shown in FIG. 5. At that time, finger F is inserted through the front opening 18 of the mirror housing 14 and into the chamber 16 for application to the finger piece catch depressor 102 for deflecting the detent catch 100 to the release position shown in FIG. 5. The corresponding mount bosses 68 may then be disengaged from the respective detents 96, 100 and the mirror retainer 20 manually disassembled from the pivot block 62.

Similarly for assembly the mirror retainer 20 within and upon the housing 14, with the finger piece catch depressor 102 angularly tilted manually FIG. 5, the mirror retainer 20 may be manually assembled such that the pivot block 62 is cooperatively received within the recessed portion 90 of the mirror retainer 20, until the rear surface portions 72 of the bosses 68 underlie the corresponding detents 96 and 100. At that time, the depressor 102 is manually released and the flexible catch 98 returns to the pivot block anchor position shown in FIG. 3.

Thus, there has been described a snap on-snap off mirror retainer which may be easily assembled on and removed from pivot block 62, which is at all times retained within chamber 16 upon and against the hemispherical seat 40.

By this construction, the present remote control mirror system is servicable in the field. A broken mirror and its connected retainer 20 may be disconnected from the universally adjustable pivot block 62 and removed from mirror housing 14 in less than a minute. Damaged components may be easily replaced at considerable savings in labor, costs and materials. As an example, if the mirror housing 14 is damaged, it is the only component which must be replaced. In such a case, the mirror retainer 20 is detached, cables 52 released, and pivot block 62, fasteners 38 and pivot bracket 32 removed. The old housing 14 is removed from the vehicle body and a new housing 14 replaces it. Thereafter the components parts from the old assembly are assembled in the new housing.

One additional advantage of the present construction is that with the mirror retainer 20 and its mounted mirror 26 separated from the pivot block 62 and with the open front 22 of the mirror housing 14 covered or otherwise closed, a plastic mirror housing 14 secured to a car door may move through the vehicle painting process line and thus be of the same color as the vehicle body and door. The mirror retainer and other components are assembled to the mirror housing 14 after the painting operation.

The present mirror 26 is silvered upon opposite sides so that it may be selectively used either on right hand or left hand remote control mirrors.

With the mirror assembly or system just described, the removable pivot bracket 32 is generally located in a vertical plane. The mirror and mirror retainer are moved through viewing angles which are generally suitable for the majority of drivers. In certain situations where tall people or very short people drive a vehicle, it is necessary to utilize shims between the removable pivot bracket 32 and the bosses 28 for the purpose of changing the angle of the pivot bracket including the longitudinal pivot axis of the hemispherical head upon which the mirror retainer is mounted. This will change the angles of the mirror to accommodate such persons.

Figure 13:
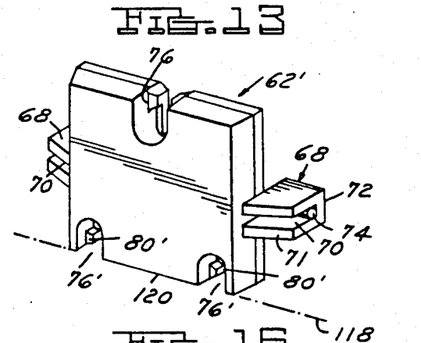
FIG. 13 is a perspective view of a modified pivot block, with the bottom bosses removed.

Prior to discussing the first modified pivot block 62' as illustrated in FIG. 13, it is necessary to refer to pivot block 62 of FIGS. 10 and 12. A horizontal line or plane 118 extends through the pivot block 62. The area of the block 62 below the horizontal line or plane 118 is designated by the numeral 119. Area 119 of pivot block 62 has been eliminated from the first modified pivot block 62' illustrated in FIG. 13. In that embodiment the same numerals will be used to designate similar parts or components. Thus, it will appear that the modified pivot block 62' of FIG. 13 is similar to the pivot block 62 of FIG. 10 and 12 except that the modified pivot block 62' is not provided with the lower area 119 located below the line 118. Instead the modified pivot block 62' is provided with a generally flat surface 120. Surface 120 is provided with a pair of downwardly opening cable anchor slots 76'. The heights of the slot 76' provided with slots 80' are of generally the same size as the slots 76.

Figure 14:
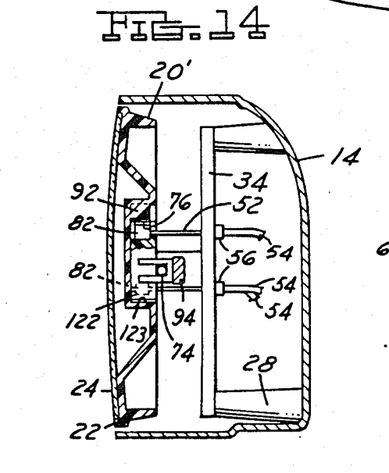
FIG. 14 is a sectional view of an embodiment of the remote control mirror assembly using the modified pivot block of FIG. 13.

The modified pivot block 62' is illustrated in an assembled position with a modified mirror retainer 20' in FIG. 14. The modified mirror retainer 20' includes a recess portion which has been modified so as to eliminate the two lower cable ferrule retaining bosses 92 as used in FIG. 11. While no lower bosses 92 are provided in the recess portion of the modified mirror retainer 20', it should be noted that the upper portion of the pivot block 62' is similar to pivot block 62 since it is designed to receive the ferrule retaining boss 92 as shown in FIG. 14. Thus, when the modified pivot block 62' is assembled with the modified mirror retainer 20', as shown in FIG. 14, the ferrule retaining boss 92 of the retainer 20' is received in the slot 76 as with the embodiment of FIG. 9. The two other ferrules 82, provided on the cables 52, are retained in the modified slots 76' by the surfaces 122 and 123 of the recess portion of the mirror retainer 20'.

The remote controlled mirror system illustrated in FIG. 14 includes the stabilizing pin or roll bar 74, with the system or assembly functioning in the same manner as the embodiment described previously. In addition, the modified mirror retainer 20' includes a pair of spaced resilient detent means or catches 94 and 98 of the type shown in FIG. 11. With such a construction the modified mirror retainer 20' may be removed from the housing 14 either by hand or by a tool as described previously.

Figure 15:
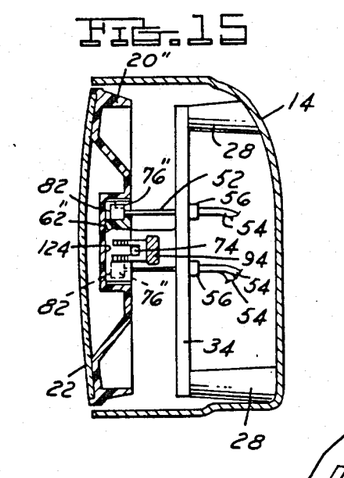
FIG. 15 is a sectional view of still another embodiment of the remote control mirror assembly using where the modified pivot block, not having any bosses, either at the top or bottom thereof.
Figure 16:
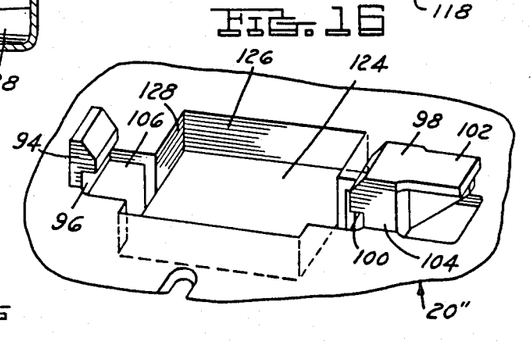
FIG. 16 is a fragmentary perspective view of a modified mirror retainer without any bosses, with the recess being of rectangular configuration and having smooth side walls or surfaces.

FIGS. 15 and 16 illustrate a modified remote control mirror assembly of the types generally described with the exception that the pivot block and mirror retainer have been modified so as to eliminate the use of ferrule retaining bosses 92 on the retainer as shown in FIG. 11. From a comparison of FIGS. 15 and 16 with FIGS. 9 and 11 respectively, it will be observed that no bosses 92 are utilized.

Thus the modified pivot block 62" of FIG. 15 is provided with a single upwardly opening cable anchor slot 76" and a pair of downwardly opening cable anchor slots 76". Within each of the slots 76" there is formed a slot of reduced with like slot 80 of the preferred embodiment. As with the other embodiments, each of the corresponding control cables 52 have secured upon their ends the retaining sleeves or ferrules 82. The cable anchoring ferrules 82, FIG. 15, are received within the modified slots 76" thereby removably securing the modified pivot blocks 62" to the outer ends of the corresponding cables 52. This retains the pivot block 62" so that its seat is in cooperative registry with and receives teh spherical mounting head. The head is provided with a slot as in the other embodiments to receive the stabilizing pin 74. FIGS. 15 and 16 include the modified mirror retainer 20" which has a recess of generally rectangular configuration including a flat bottom surface 124 and generally flat side surfaces 126 and 128. The surfaces including the bottom surface 124 retain the cable anchoring ferrules 82 in assembled position within the slots 76" as modified as shown in FIG. 15 so as to prevent the ferrules 82 and cables 52 from escaping from the slots 76" during the operation of the mirror system. The modified mirror retainer 20' includes the catches 94 and 98 as provided with the mirror retainers described previously. Thus the modified mirror retainer 20" is cable operated and if damage to the mirror occurs the component parts of the assembly may be disassembled in the manner discussed previously. The modified mirror retainer 20" may be removed either by hand or with the use of a tool.

The removable mirror retainers 20, 20' and 20" disclosed herein have been described previously for use with a spherical mounting element provided with a slot having a stabilizer pin or roll bar 74 as in the aforesaid U.S. Pat. No. 4,027,548. There are three other cable remote control mirror systems in commercial use and the invention described herein may be used with them with slight modifications.

Figure 17:
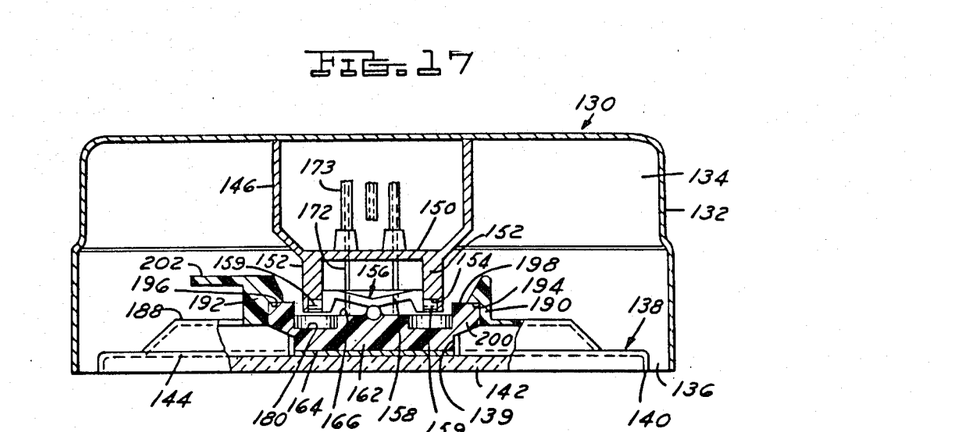
FIG. 17 is a horizontal section of a modified remote control mirror assembly having a modified mounting arrangement for the adjustable pivot block and attached mirror retainer.
Figure 18:
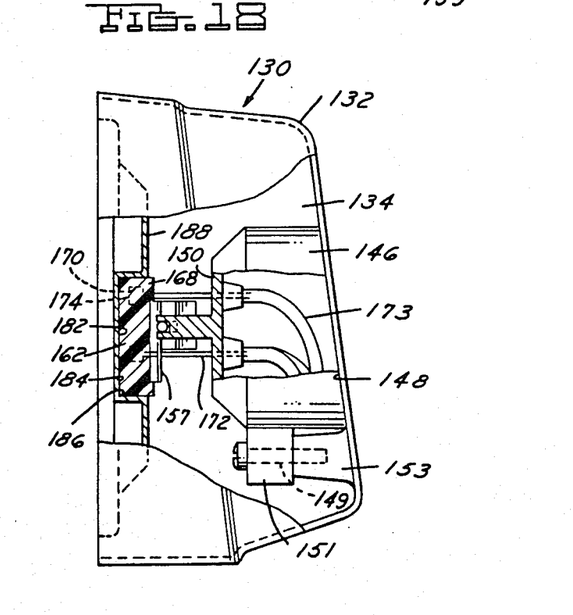
FIG. 18 is a vertical end view, with parts broken away and in section, of the modified remote control mirror assembly of FIG. 17.

One such commercial system, as modified, is illustrated in FIGS. 17 and 18. It uses a conventional mounting or pivot element 156 in the form of a "cross T" comprising an elongated rod 157 having a pair of laterally extending arms 158 terminating in trunnions 159.

The modified remote control mirror assembly 130 of FIG. 17 and 18 includes the usual protective mirror housing 132 fabricated from metal or from a plastic material. The mirror housing 132 includes a chamber or inner space 134 and an open front 136 of a predetermined shape, which, for illustrative purposes, is substantially rectangular with rounded corners. The removable mirror retainer 138 is constructed, as an example, from a plastic material and includes a peripheral annular flange 140 to cooperatively receive the mirror 142 which bears against the corresponding backing surfaces 144 and is suitably secured thereto such as by an adhesive material.

Within the mirror housing 132 there is provided a generally centrally located hollow mounting bracket 146 which is secured to the back wall 148 of the housing 132, as an example, by threaded fasteners 149 interposed between a bracket flange 151 and a housing stud 153. The bracket 146 is of tubular or hollow construction and includes a front mounting member or plate 150 provided with holes for the three cables 172. The mounting member or plate 150 is provided with a pair of laterally extending arms 152 which are spaced apart as shown in FIG. 17 and are provided with opposed open ended recesses or slots 154 for receiving the trunnions 159 of the cross T or element 156 of known construction.

Figures 19, 20, 21, 22:
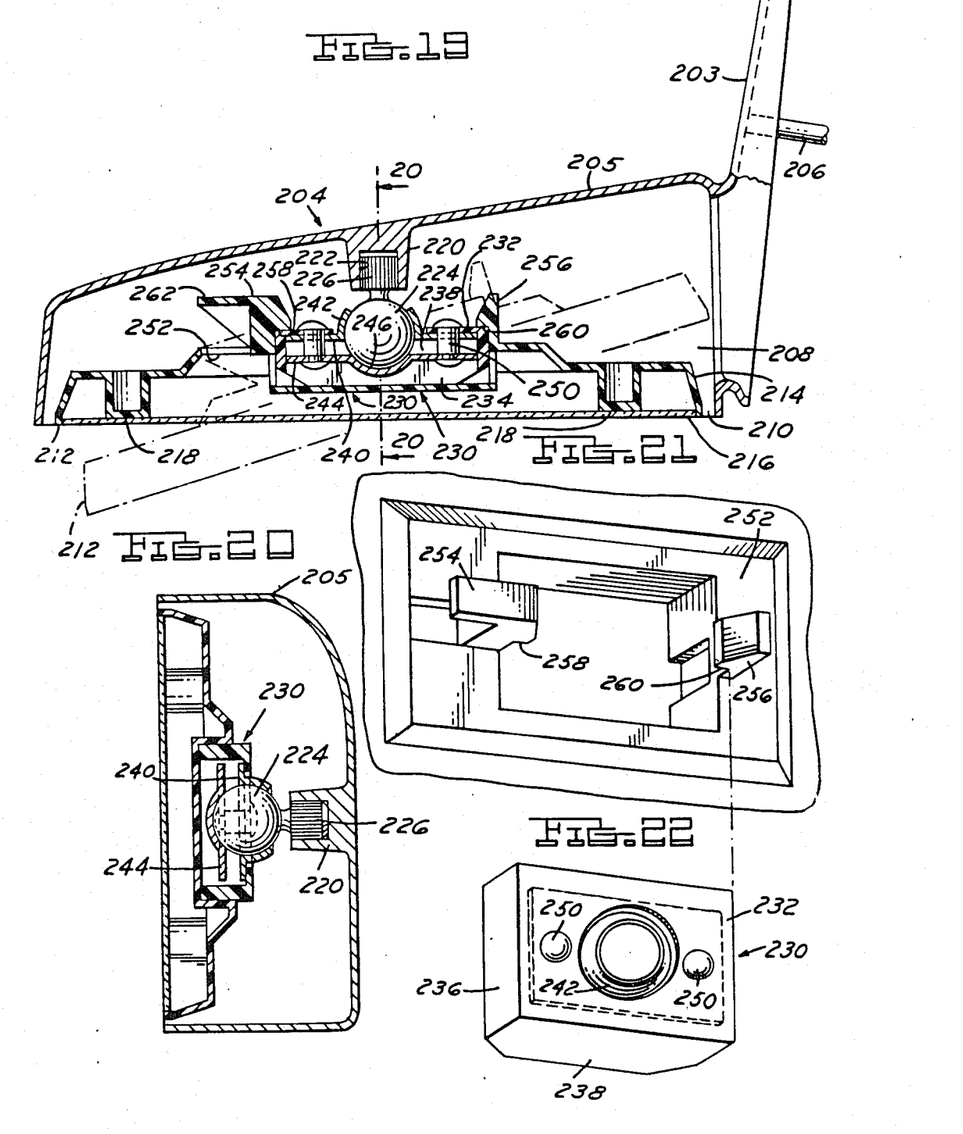
FIG. 19 is a horizontal section of a modified manually operated adjustable mirror assembly, illustrating the adjustable pivot block mounted on a spherical mounting element and the mirror retainer provided with yieldable detent means receiving the pivot block.
FIG. 20 is a vertical sectional view of the manual type of mirror system taken on the line 20—20 of FIG. 19.
FIG. 21 is a fragmentary perspective view of the mirror retainer of FIGS. 19 and 20, without any bosses, and with the recess being of rectangular configuration and having generally smooth side walls or surfaces.
FIG. 22 is a perspective view of the pivot block used in the manual type of mirror system shown in FIGS. 19 and 20.

The pivot block 162 is of generally rectangular configuration as noted in FIGS. 17 and 18. One surface 164 of the block 162 is flat. The other surface 166 is provided with three slots 168 enlarged at 170 to receive the ferrules 174 on the cables 172. The cables 172 are of such length as to be individually translated inwardly through the corresponding slots 168 and slots 170. At the same time the cable anchoring ferrules 174, retaining engage surfaces on the pivot block 162 within the outwardly opening slots 168 as shown in FIG. 19. This provides a means by which the pivot block 162 is removably secured to the outer ends or ferrules 174 of the corresponding cables 172.

The pivot block 162 on its inner surface 166 has secured thereto the rod 157 of the cross T 156 which includes the pair of laterally extending arms 158, each terminating in a trunnion or mounting element 159 received within the or slot 154 recess provided in the arm 152.

Thus when the cross T 156 is secured to the surface 166 of the pivot block 162 and the cables 172 are within the slots 168 and 170, the mounting elements or trunnions 159 are held in the recesses or slots 154 of the arms 152 by the tension of the cables. With such a construction the pivot block 162 is mounted for universal movement.

A remote control unit, not shown, is arranged so that universal adjustments of the corresponding control knob, not shown, provides corresponding longitudinal movements of the cables 172 within their protective sleeves 173 so as to affect corresponding universal adjustments of the pivot block 162 and the cross T 156. To accommodate the movement of the cross T and the pivot block 162 the back surface 166 of the pivot block 162 is provided with a pair of enlarged recesses 180 so as to avoid interference with surrounding structure during movement thereof.

The mirror retainer 138 is provided with a generally rectangular pivot block recess or recess portion 182 of such shape and size as to snugly receive the pivot block 162. The pivot block recess 182 includes a flat bottom surface 184 and four generally flat side surfaces or walls 186.

Mounted upon the rear surface 188 of the mirror retainer 138 forming an integral part thereof, there is provided a pair of spaced resilient detent means or catches 190 and 192. Each of the catches 190 and 192 have inwardly projecting detents 194 and 196, respectively which are adapted to overlie and retainingly engaged rear surface portions 198 of the pivot block bosses or elements 200 as shown in FIG. 17. Outwardly of the recess portion 182 of the modified mirror retainer 138 are a pair of aligned chearance slots adapted to cooperatively receive the corresponding mount bosses 200 of the pivot block 162 as shown in FIG. 17. The finger piece 202 on the flexible catch 192 may be manually depressed utilizing the human finger as in the other embodiment or a tool may be used to depress the finger catch 202 thereby removing the mirror retainer 138.

Should it be desirable to manually remove the mirror retainer 138 from the interior of the mirror housing 132, all that is necessary is to activate the remote control unit so that the mirror retainer 138 of FIG. 17 is tilted to the angular position corresponding to the one shown in FIG. 5. At that time a finger or a tool is inserted through the front opening 136 of the mirror housing 132 and into the chamber 134 for application of a force to the finger piece catch depressor 202 for deflecting the detent catch to the release position. Once the mirror retainer 138 has been removed from the mirror assembly 130, the pivot block 162 carrying the cross T 156 may be removed from the bracket arms 152. Thereafter the cables 172 may be disassembled from the pivot block 162.

With the aforesaid modified construction, new component parts may be inserted into the mirror assembly 130 or broken parts replaced in the same manner as described previously.

It should be appreciated that there are other types of hinge, pivot or mounting arrangements for adjustably mounting the pivot block on the mounting bracket of the mirror housing. Besides the use of the stabilizing or roll bar 74 and cross T 156, both previously described, other types of mounting arrangement such as a "living hinge" or "trunnion" may be used which permits for universal adjustment of the pivot block and the removable mirror retainer carried thereby.

The adjustable mirror assembly 204 of the manual type is illustrated in FIGS. 19-22 inclusive. The mirror assembly 204 comprises a mirror base 203 which may, for example, be secured to the door panel of an automobile, not shown, and a protective mirror housing 204 integral with the base 203. A plurality of threaded fasteners 206 project outwardly of the base 202 and are adapted for securing within corresponding spaced apertures formed in a portion of the vehicle body or door. The protective mirror housing 205 and base 203 may be made from a plastic material or from a metal as is known in the art. The mirror body 205 and base 203, when made from plastic, may be attached to the automobile during the manufacture of same and prior to painting. Thus the base 203 and housing 205 would be painted the same color as the automobile body prior to the mirror subassembly and retainer being attached thereto. It should be appreciated however that the entire mirror assembly 204 may be attached to the vehicle body after it has been painted.

The mirror housing 205 includes the usual chamber or inner space 208 and an open front 210 of a predetermined shape, which in the illustrative embodiment in FIGS. 19 and 20 is substantially rectangular with rounded corners. It should be appreciated that the shape of the mirror retainer 212 and mirror housing 205 may vary and the assume the shape of rectangular, square, oval, round, etc.

The mirror retainer 212, preferrably constructed from a plastic material, includes a peripheral flange 214 to cooperatively receive a mirror 216 which bears against corresponding retainer backing abutments or surfaces 218 and is suitably secured thereto by means of adhesive material or in any other conventional manner.

Within the mirror housing 205 and chamber 208 there is provided a centrally located mounting embossment 220 having an outwardly facing opening 222 for receiving the threaded or knurled end of a ball stud 224. The ball stud 224 includes a knurled stem 226 adapted to be received in and to cut the threads in the opening 222. The ball stud 224 is mounted in the manually operated pivot block 230 illustrated in FIG. 22 prior to insertion of the knurled stem 226 in the opening 222.

Pivot block 230 is of rectangular configuration and includes a front wall or surface 232, a back or rear surface 234 and side surfaces 236 and 238. The pivot block 230 is hollow and includes a socket reinforcement plate 240 having a spherical socket 242 for the ball stud 224. The pivot block 230 further includes a tension spring or plate 244 having a spherical recess 246 for seating an opposing portion of the ball stud 224 as shown in FIG. 19. The socket reinforcement plate 240 and the tension spring 244 are spaced apart within the pivot block 230 and secured to the front wall 232 by means of a pair of spaced rivets 250. The rivets 250 secure opposing portions of the tension spring 244, socket reinforcement plate 240 and the top wall or flange 232 of the housing together. With such a construction the ball stud 224 can be manually moved or rotated within the confines of the spehercal socket 242 and seat 246.

Once the pivot block 230 has been affixed to the ball stud 224 the knurled stem 226 is forced fitted or pressed into the embossment 220 for mounting the pivot block centrally within the opening 222.

Mounted upon the rear surface 252 of the mirror retainer 212 forming an integral part thereof, there is provided a pair of spaced resilient detent means or catches 254 and 256. Each of the catches 254 and 256 have inwardly projecting detents 258 and 260 respectively which are adapted to overlie and retainingly engage portions of the surface 232 of the pivot block 230. This arrangement is best illustrated in FIG. 19. The finger piece 262 on the flexible catch 254 may be manually depressed either by utilizing a human finger as discussed previously or by using a hand held tool. The flexible catch 254 and detent means 258 is pivoted with respect to its flexible leg as best illustrated in FIG. 19. The disengagement or release position of the spring retainer 212 is shown in dotted lines in FIG. 19.

In normal operation, should it be desired to manually remove the mirror retainer 212 from the interior 208 of the mirror housing 205, all that is necessary is to manually move the mirror and its retainer 212 to the tilted or angular position shown by the dotted lines in FIG. 19. At that time, a finger or a tool is inserted through the front opening 210 of the mirror housing 205 and into the chamber 208 for application of a force to the finger piece catch depressor 262, for deflecting the detent catch to the release position shown in dotted lines in FIG. 19. Once the mirror retainer 212 has been removed from the assembly 204, a force may be applied to the pivot block 230 so as to remove it and the ball stud 224 from the mounting embossment 220 to permit a damaged housing 205 to be replaced, if required.

Thus, there has been described a snap on-snap off mirror retainer 212 which may be easily assembled on and removed from the pivot block 230, which is at all times retained on the ball stud 224 within the chamber 208 as a result of the spring action of the tension spring 244.

Having described our invention, reference should now be had to the following claims,

We claim:

1. A mirror assembly comprising:
    a mirror housing which defines an interior chamber and a front opening;
    a mounting head located in said chamber;
    a pivot block movably mounted on said head;
    a mirror retainer disposed in said chamber and detachably secured to said pivot block;
    a mirror secured to said retainer for selective adjustment to a plurality of positions including a first position in which said mirror substantially fills said front opening and a second position in which said mirror and said housing define an access opening for communicating with said chamber; and
    flexible catch means disposed on at least one of said retainer and said pivot block for releasably securing said retainer to said pivot block, said catch means having an external surface accessible through said access opening when said mirror is in said second position for depressing to effect detachment of said retainer from said pivot block.

2. The mirror assembly of claim 1 wherein said retainer has a recessed portion therein of a size and shape to receive said pivot block, said pivot block being retained by said flexible catch means.

3. The mirror assembly of claim 1 wherein said pivot block has a socket element receiving and movably mounted upon said head.

4. The mirror assembly of claim 1 wherein said head is of at least part spherical configuration.

5. The mirror assembly of claim 1 further comprising second catch means disposed on said retainer for engaging said pivot block.

6. The mirror assembly of claim 1 wherein said flexible catch means has an inwardly projecting detent adapted to overlie and retainingly engage said pivot block, said depressable surface being operable to pivot said detent to a pivot block releasing position.

7. The mirror assembly of claim 1 further comprising a second catch means disposed on said retainer, said flexible catch means and said second catch means having opposing detents retainingly engaging said pivot block, said flexible catch being manually yieldable to disengage said pivot block for selective assembly and disassembly of said mirror retainer.

8. The mirror assembly of claim 1 wherein said mirror retainer is or plastic material and said catch means extends from and integrally forms a part of said retainer.

* * * * *

UNITED STATES PATENT AND TRADEMARK OFFICE
CERTIFICATE OF CORRECTION

PATENT NO. : 4,776,231

DATED : October 11, 1988

INVENTOR(S) : Michael Cummins, et al

Page 1 of 2

It is certified that error appears in the above-identified patent and that said Letters Patent is hereby corrected as shown below:

Column 2, line 35, "cnotrol" should be -- control --.

Column 4, line 50, "There" should be -- These --.

Column 5, line 67, "," should be -- . --.

Column 6, line 27, after "88" delete -- of --.

Column 8, line 18, "cataches" should be -- catches --.

Column 8, line 44, "teh" should be -- the --.

Column 10, line 16, "engaged" should be -- engage --.

Column 10, line 19, "chearance" should be -- clearance --.

UNITED STATES PATENT AND TRADEMARK OFFICE
CERTIFICATE OF CORRECTION

PATENT NO. : 4,776,231

DATED : October 11, 1988

INVENTOR(S) : Michael Cummins, et al

It is certified that error appears in the above-identified patent and that said Letters Patent is hereby corrected as shown below:

Column 12, line 19, "," should be --:--.

Column 12, line 66, Claim 8, "or" should be --of--.

Signed and Sealed this

Fourth Day of June, 1991

*Attest:*

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,776,231

DATED : October 11, 1988

INVENTOR(S) : Michael Cummins et al

It is certified that error appears in the above-identified patent and that said Letters Patent is hereby corrected as shown below:

Column 1, lines 33-34, "coventional" should be -- conventional --.

Column 11, line 14, "preferrably" should be -- preferably --.

Column 12, line 55, Claim 6, "depressable" should be -- depressible --.

Signed and Sealed this

First Day of December, 1992

*Attest:*

DOUGLAS B. COMER

*Attesting Officer*   *Acting Commissioner of Patents and Trademarks*